United States Patent [19]

Taylor

[11] 4,442,860

[45] Apr. 17, 1984

[54] PILOT CONTROL RELAY VALVE APPARATUS

[75] Inventor: Donald K. Taylor, Humble, Tex.

[73] Assignee: C.S.E. Automation Engineering & Services, Inc., Doucon, La.

[21] Appl. No.: 315,258

[22] Filed: Oct. 26, 1981

[51] Int. Cl.³ .................................. F16K 17/00
[52] U.S. Cl. .......................... 137/557; 137/556; 137/458; 137/625.66
[58] Field of Search ............... 137/625.66, 458, 557, 137/553, 556

[56] References Cited

U.S. PATENT DOCUMENTS

| | | | |
|---|---|---|---|
| 3,823,739 | 7/1974 | McMullen | 137/625.66 |
| 3,877,484 | 4/1975 | Theriot et al. | 137/458 |
| 4,073,466 | 2/1978 | Snyder | 137/625.66 |
| 4,160,463 | 7/1979 | Akkerman et al. | 137/458 |
| 4,173,986 | 11/1979 | Martin | 137/463 |

Primary Examiner—A. Michael Chambers
Attorney, Agent, or Firm—Keaty & Keaty

[57] ABSTRACT

An improved pilot control relay valve is disclosed to monitor pressure conditions in a system and to shut down in response to the detection of pilot pressure outside a predetermined range. Dual piston action actuates a visual indicator mounted on the slide valve of the control relay valve.

2 Claims, 9 Drawing Figures

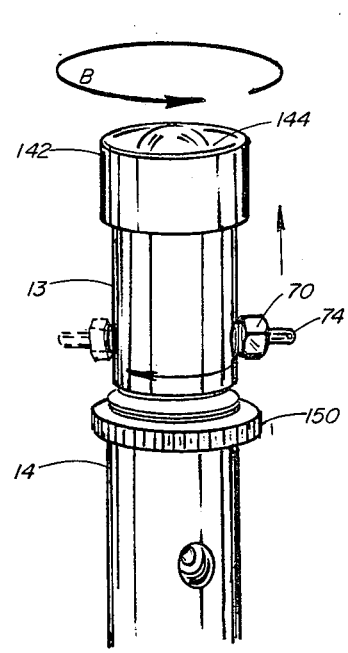
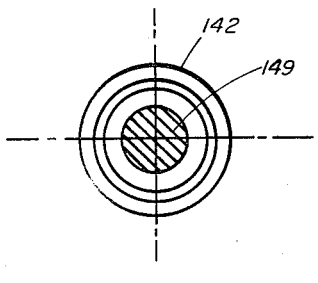
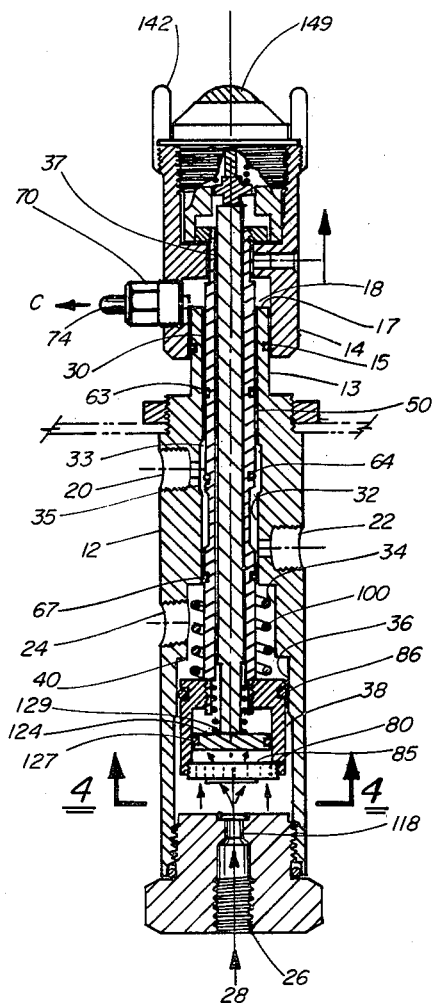
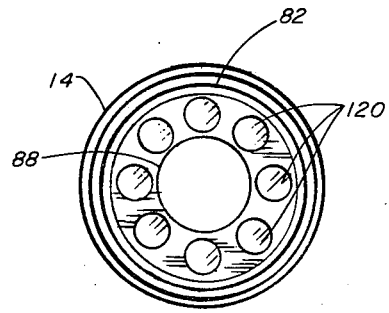
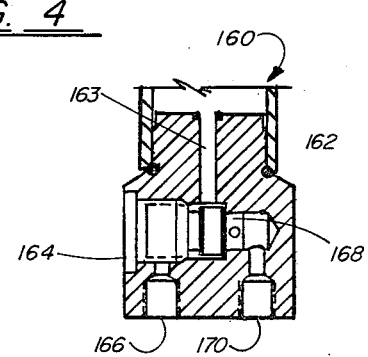
FIG. 8
FIG. 6
FIG. 4
FIG. 9
FIG. 3

PILOT CONTROL RELAY VALVE APPARATUS

BACKGROUND OF THE INVENTION

1. Field of the Invention

The present invention relates to control valves and more particularly relates to an improved pilot control relay valve utilized to monitor pressure conditions in a pressurized system and to cause the system to shut down in response to detection of operating pressures outside of a predetermined acceptable pressure range. Accurate monitoring is provided for by dual pistioning action hydraulically actuates a visual indicator mounted on the slide valve of said control valve.

2. General Background

A control valve is normally placed in a fluid flow line or a fluid actuator to prevent the flow of fluid until a fluid pressure reaches a predetermined operating range. Control valves known in the art which have been patented include:

| | |
|---|---|
| U.S. Pat. No. 3,943,974 | U.S. Pat. No. 4,240,609 |
| U.S. Pat. No. 4,074,702 | U.S. Pat. No. 4,254,799 |
| U.S. Pat. No. 4,194,529 | U.S. Pat. No. 4,252,145 |
| U.S. Pat. No. 4,194,719 | U.S. Pat. No. 4,252,146 |
| U.S. Pat. No. 4,196,750 | U.S. Pat. No. 4,254,798 |
| U.S. Pat. No. 4,203,571 | U.S. Pat. No. 4,256,141 |
| U.S. Pat. No. 4,207,924 | U.S. Pat. No. 4,263,938 |
| U.S. Pat. No. 4,213,481 | U.S. Pat. No. 4,267,862 |
| U.S. Pat. No. 4,215,746 | U.S. Pat. No. 4,275,865 |
| U.S. Pat. No. 4,217,934 | U.S. Pat. No. 4,237,931 |
| U.S. Pat. No. 4,220,174 | U.S. Pat. No. 4,239,058 |
| U.S. Pat. No. 4,234,162 | U.S. Pat. No. 3,038,439 |
| U.S. Pat. No. 3,448,228 | U.S. Pat. No. 3,109,441 |
| U.S. Pat. No. 3,202,170 | U.S. Pat. No. 3,189,277 |
| U.S. Pat. No. 3,769,996 | U.S. Pat. No. 3,985,337 |

U.S. Pat. Nos. 3,943,974, 4,194,529, 4,074,702, 4,196,750, 4,207,924, 4,239,058, 4,252,145, 4,256,141 and 4,263,938 provide a single elongated housing with a bore extending longitudinally therethrough and containing a slide valve mounted therein. The slide valve and internal components of the housing are not sealed and therefore are exposed to adverse environmental influences such as mud, dirt salt water, and the like. In this regard, frequent maintainence is required on the control valve resulting in a shut down of the main line during such period. Another disadvantage of the prior art is that in using a single housing with a shaft therein to manually reset the slide valve to an outward or displaced position, the shaft itself must be grasped and pulled out, often resulting in bending of the shaft assembly. This manual reset capability increases the possibility of a complete failure of the shaft or bending to a point where it is unable to return to its normal functioning position. A further disadvantage of the prior art is that these contol valves use a latching pin which provides for a manual detent means when depressed which actually engages the slide valve, and, in extended operations wears a groove therein, the groove eventually becoming rounded to a point that the detent pin begins to slip and fail in its intended function. The wearing can also lead to O-ring slippage destroying the systems integrity. Another disadvantage of prior art is that the indicator means, as with the internal components, is exposed to adverse environmental conditions by being externally mounted on the slide valve. This external mounting also leads to abuse during the manual resetting of the slide valve. Also, when the indicator is malfunctioning and needs replacement, the entire control valve becomes inoperable and the main line it is controlling must be shut down.

A further disadvantage of the prior art is the use of a fluid passageway extending longitudinally within the slide valve to direct fluid from the pilot port to the indicator means to actuate the indicator in that the passageway can be blocked or provide an uneven pressure distribution thus resulting in a "false" indication of the operating condition of the system. The present invention provides a solid shaft longitudinal of the bore of the slide valve which is subject to fluid pressure from the pilot port to actuate the indicator means.

The present invention seeks to solve the above-named problems by providing a second external housing which protects the slide valve shaft from the effects of the environment and manual abuse by sealingly providing a cover for the internal components and a means for manually resetting the valve. The second external housing also provides a housing for the manual detent means so that it can engage the lip of the main body housing instead of the slide valve shaft itself to provide consistent gripping without wear on the slide valve shaft. Further, the indicator means is encapsulated in the secondary external housing so that it can be easily removed for maintenance or replacement while the control valve remains in operation.

Further, in considering the shortcomings of the prior art devices, it should be noted that many prior art slide valve-actuated indicators are actuated by fluid pressure and due to unequal distribution of fluid and clogging are not capable of giving consistently accurate indictions of the operating conditions of the system. The present invention, by providing a second internal shaft and piston, produces a consistent and reliable visual indication of the operating conditions of the system.

3. Summary of the Invention

The present invention provides for a pilot relay control valve with a visual indicator mounted thereon, the control valve having a main body housing with a bore extending longitudinally thereof for housing a main slide valve with one end portion extending from the main body housing into a secondary housing or cover which provides a protective cover and a means for manually moving the slide valve to a displaced position for setting the control valve as required in the system. In.the main body housing are provided ports that control the flow of fluid in the system and that apply fluid pressure to a first piston means on the other end of the slide valve to move it outwardly. The first piston face is provided with a plurality of holes therein for transmitting fluid pressure to a second interior piston means housed in the first piston means. The second piston means is provided on the end of a shaft which extends throughout the length of the slide valve coaxially therewith. Mounted to the outer end of the coaxial slide valve and shaft is a visual indicator means which uses a two color system to indicate the operating status of the control system. The visual indicator has a two color member movable between two positions for indicating which of two operating conditions exist. In operation, when the second piston is not subject to fluid pressure the visual indicator exposes one colored side and when the second piston means is subject to fluid pressure, movement is imparted to the shaft and the visual indicator exposes the other colored side. A manual detent means is provided in the secondary housing or cover to maintain the slide valve in an out position until a predetermined high pressure is obtained. The manual detent is depressable inwardly to engage a lip portion of the main body housing and hold the slide the valve in its out position until the slide valve is moved out of engagement with the detent.

It is an object of the present invention to provide a pilot relay control valve with dual housing for protection of the slide valve shaft therein.

A further object of the present invention is to provide a control valve in which the main slide valve shaft is sealed from exposure to adverse environmental conditions such as mud, dirt and salt water.

It is a further object of the present invention to provide a means for wiping clean the internal portion of the main body housing when it is to be exposed to adverse environmental conditions.

It is a further object of the present invention to provide a control valve with a slide valve assembly with a manual reset capability, yet reduced susceptibility of the slide valve to bending.

It is a further object of the present invention to provide a manual detent means for setting the control valve in an out position in which the catch or latching pin does not engage the surface of the slide valve but, instead, the lip portion of the main housing to eliminate surface wear of the slide valve.

It is a further object of the present invention to provide a control valve and visual indicator means in which the visual indicator means can be maintained or replaced without a shut down of the control valve operation.

It is a further object of the present invention to provide an internal shaft to actuate the visual indicator means.

DETAILED DESCRIPTION OF THE DRAWINGS

For a further understanding of the nature, advantages and objects of the present invention, reference should be had to the following detailed description taken in conjunction with the accompanying drawings in which like parts are given like reference numerals and wherein:

FIG. 3 is a sectional view of the control valve of the present invention with the main piston and secondary piston being shown in the raised operative unseated position;

FIG. 4 is a bottom view of the face of the main piston taken in the direction of arrows 4—4;

FIG. 6 is a top view of the visual indicator means of the present invention with the indicator showing an operative condition;

FIG. 8 is a partial perspective view of the apparatus of the present invention;

FIG. 9 is a sectional view of the alternate embodiment of the end plug of the present invention.

DETAILED DESCRIPTIOJN OF THE PREFERRED EMBODIMENT

Figure 5A:
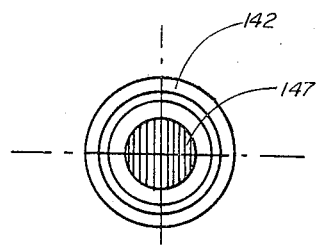
FIG. 5 is a top view of the visual indicator means of the present invention with the indicator showing an inoperative condition.
Figure 5B:
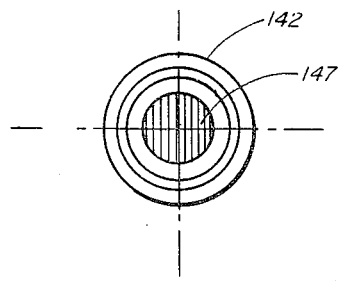
Figure 1:
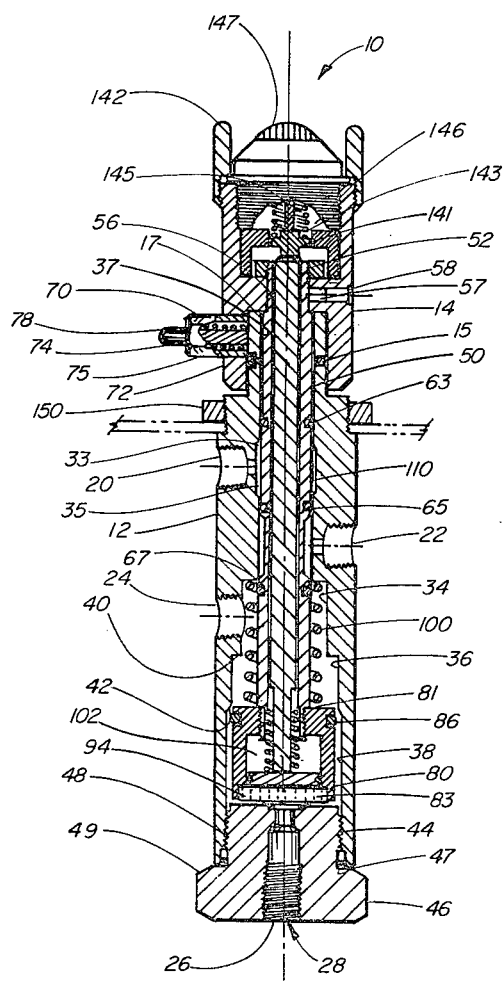
FIG. 1 is a sectional view of the control valve of the present invention with the main piston being shown in a down seated position.
Figure 2:
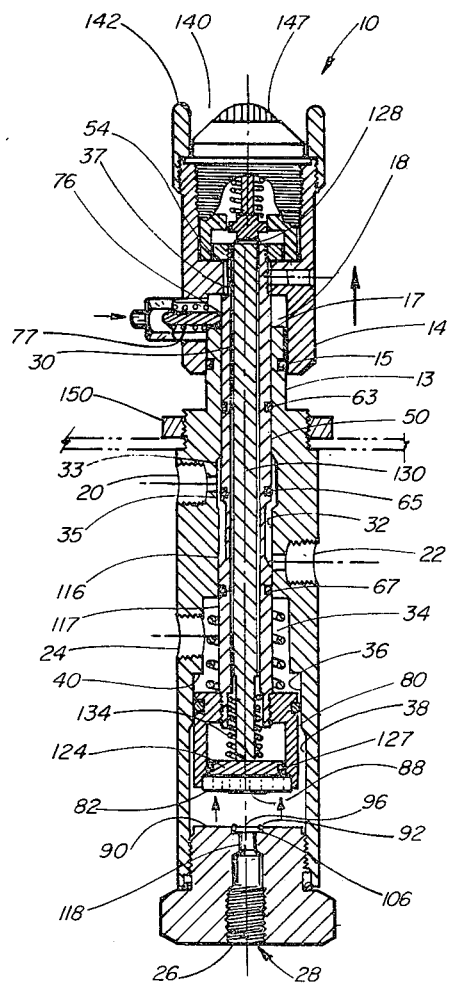
FIG. 2 is a sectional view of the control valve of the present invention with the main piston being shown in its raised unseated reset position.

The preferred embodiment of the apparatus of the present invention is designated generally by the numeral 10 in FIGS. 1, 2 and 3. Control valve 10 is comprised generally of main valve body housing 12 having upper neck portion 13 thereon for slidably entering secondary housing or valve cover 14. Valve cover 14 has recess area 18 of an inside diameter slightly larger than the diameter of upper neck portion 13 and a depth slightly less than the length of upper neck portion 13 for receiving said neck portion. Valve body housing 12 and valve cover 14 have a coaxial longitudinal bore generally indicated at 30. Main valve body housing 12 has a main bore 32 of a reduced diameter and intermediate bore 34 of an enlarged diameter and enlarged diameter portions 36 and 38. Main O-ring 15 is carried on neck 13 in an annular groove 16 therein and is effective to prevent entry of fluid or other particulate matter into coaxial bores 30 and to force particulate matter from the area between neck 13 and the inner wall of recess 18 during operations to be described below. The lower end of housing 12 has internal screw threads 44 formed therein for receiving externally threaded end plug 46 which has external screw threads 48 for engaging internal threads 44. O-ring 47 is provided on shoulder portion 49 of plug 46 to effectively seal control valve 10 from any leakage in the area between complimentary threads 44 and 48. Central internally threaded bore 26 is provided in end plug 46 for receiving an externally threaded line. In an alternate embodiment, as seen in FIG. 9, end plug 46 is provided with additional features as well be described herein below.

Figure 7:
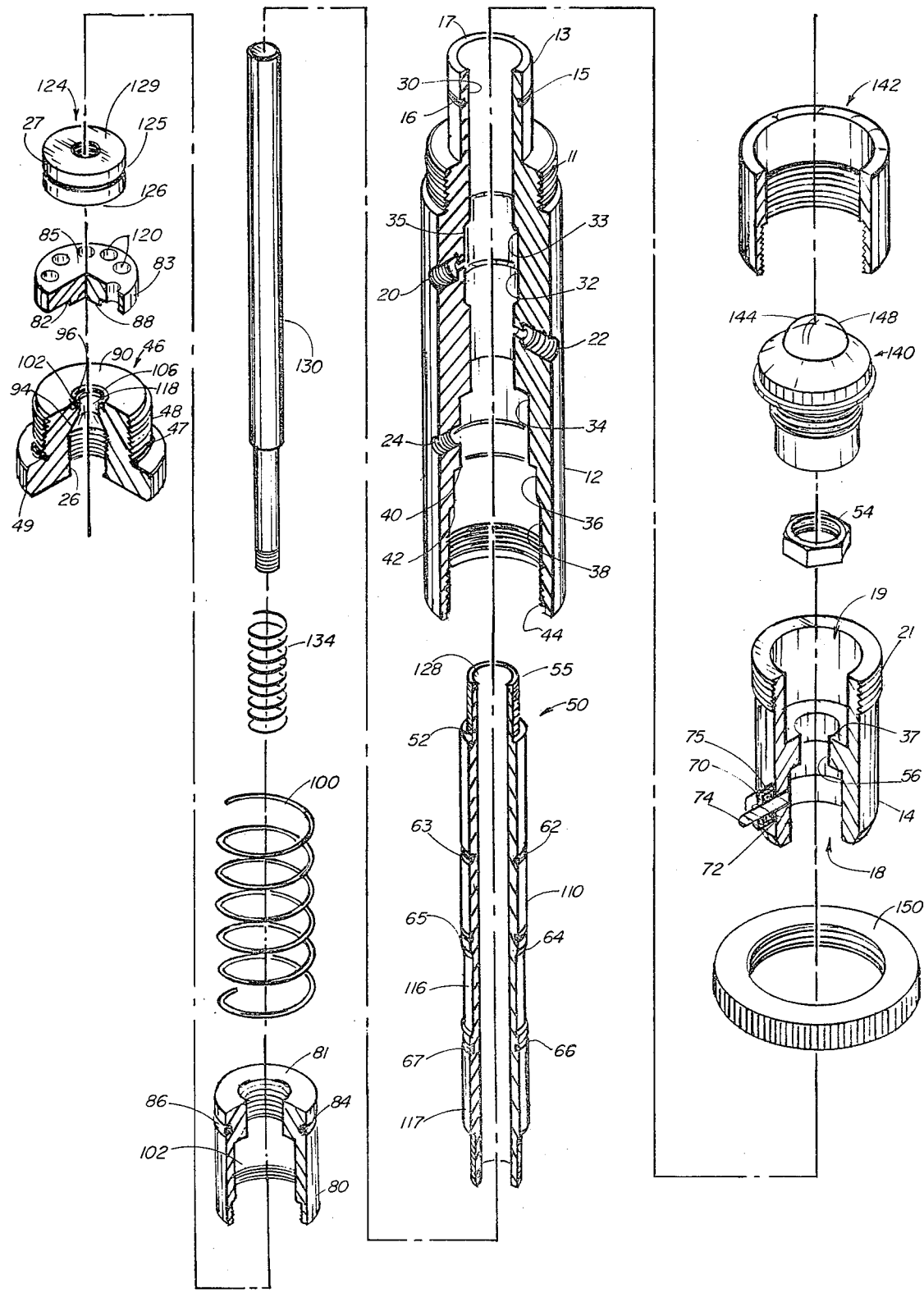
FIG. 7 is a perspective exploded view of the preferred embodiment of the apparatus of the present invention.

Housing 12 is provided with threaded inlet port 20 which communicates with main bore 32 and enlarged diameter portion 33 adjacent port 20 provides pressurized gas in chamber 35 formed thereby. Threaded outlet port 22 is formed in housing 12 and is connected to an outlet line to supply pressurized fluid to an actuator or other control mechanism. Vent 24 is in fluid communication with intermediate bore portion 34 while outlet 22 is in fluid communication with main bore 32. A slide valve is indicated generally at 50 and is disposed to run through coaxial bore 30 longitudinally thereof. A primary piston means generally means indicated at 80 is secured adjacent the inner end of slide valve 50 and is mounted within enlarged diameter portions 36 and 38 for movement. The main body of slide valve 50 extends longitudinally through coaxial bore section 30 of housing 12 and valve cover 14 and is threaded at its upper portion 52. As seen in FIG. 7, the upper portion 52 of slide valve 50 is of a reduced diameter and of a length to receive projection 56 formed by the reduced diameter 37 of valve cover 14. Upper portion 52 of slide valve 50 is threaded at its upper most portion and threadably attached there to is nut 54 which is of an outside diameter greater than reduced bore 37 of valve cover 14. In this manner, valve cover 14 are integrally connected and the movement of slide valve 50 longitudinally of coaxial bore 30 is coextensive with the movement of valve cover 14 on neck portion 13. Further provided in upper portion 52 of slide valve 50 is longitudinal groove 55 for accepting pin 57 threadably inserted in hole 58 projecting through valve housing 14 and projection 56. Pin 57, when secured in longitudinal groove 55, prevents the independent rotation of valve housing 14 about slide valve 50.

The main body of slide valve 50 has annular groove portions 62, 64, and 66 disposed thereabout to provide for O-rings 63, 65 and 67 for engagement with the inner surface of main bore 32.

FIG. 2 shows slide valve 50 in a raised, unseated, reset position in which slide valve 50 remains until fluid pressure in line 26 builds up to a predetermined amount. To retain slide valve 50 in the position of FIG. 2, a cap 70 is threaded within an internally threaded opening 72 in housing cover 14. A plunger or detent 74 is mounted within cap 70 and spring 75 engages flange 77 on plunger 74 to urge continuously plunger 74 to a position out of engagement with annular shoulder portion 17 of neck 13. The outer end 78 of plunger 74 extends outwardly through an opening in cap 70. Plunger 74 is depressed inwardly (arrow A) manually by pushing it in on end 78 until the inner end 76 of plunger 74 is received on annular shoulder portion 17 and held in its depressed position by frictional contact with annular shoulder portion 17.

To hold plunger 74 in engagement with annular shoulder portion 17 of neck 13, main spring 100 is mounted within intermediate diameter portion 34 and enlarged diameter portion 36 and engages upper surface 81 of piston 80. Face 82 of piston 80 is provided on lower surface 83 of piston 80 positioned opposite upper surface 81. The outer circumference of piston 80 has an annular groove 84 in its upper portion for receiving an O-ring 86 provided for engagement with the inner surface of enlarged diameter portion 36 while in a reset position as in FIG. 2 or in operation as in FIG. 3.

As shown in FIGS. 1, 2 and 3 an annular ledge 40 is provided between intermediate bore 34 and enlarged diameter portion 36. A conical surface 42 connects the enlarged diameter portions 36 and 38. An abutment 90, being the upper surface of end plug 43, is arranged adjacent an end portion of enlarged diameter bore portion 38 and raised portion 88 of face 82 of piston 80 seats on raised abutment 92 of abutment 90 in the closed or down seated position of slide valve 50 as shown in FIG. 1. It is noted that annular ledge 40 is spaced slightly from the adjacent upper surface 81 of piston 80 in the position of FIG. 2 in which slide valve 50 is held in an out or raised or reset position by detent or plunger 74. This position is maintained until fluid pressure in pilot pressure line 28 (not shown) reaches a predetermined level at which time piston 80 is urged upwardly against the bias of spring 100 thereby to space detent 74 in valve housing 14 slightly from annular shoulder portion 17 thereby releasing detent 74 under the bias of spring 75. When detent 74 is released, control valve 10 becomes operable and piston 80 remains in the position shown in FIG. 3 so long as the fluid pressure within line 28 acting against surface 83 of piston 80 remains at or above a predetermined level. It is noted that the entire surface 83 is exposed to fluid pressure from line 28 in the positions of FIGS. 2 and 3.

In order to expose only a relatively small surface area of surface 83 to fluid pressure in line 26 when main piston 80 is in a down seated position, as in FIG. 1, a recess 96 is provided in ledge or abutment 90 and is defined by a tapered annular wall surface 104 in which an O-ring 106 is positioned better shown in FIG. 3. Returning to FIG. 1, when piston 80 is in a seated position on ledge 90, O-ring 106 is in engagement with raised portion 88 of face 82 of piston 80. Thus, only the area defined within O-ring 106 is exposed to fluid pressure from line 28 in the seated position of piston 80. By engagement of raised portion 88 with O-ring 106, the sealing of line 28 is effective yet spacing 94 between surface 83 and ledge 90 is maintained.

In operation, with piston 80 in the seated position, as shown in FIG. 1 in which the flow of fluid pressure from inlet 20 to outlet 22 is blocked by middle O-ring 65 and slide valve portion 110 (the portion of slide valve 50 between middle O-ring 65 and upper O-ring 62), fluid communication is provided between outlet port 22 and vent port 24 by reduced diameter portion 116 (that portion of slide valve 50 between middle O-ring 65 and lower O-ring 67) to bleed gas for movement of any control means to a closed position. For resetting piston 80, valve cover 14 serves as gripping means and is is moved outwardly against the bias of spring 100 with detent 74 being simultaneously manually depressed and moving inwardly a distance sufficient to frictionally engage the annular shoulder portion 17 of neck 13 when the outward movement of the valve housing 14 is terminated prior to resetting piston 80. Valve cover 14 can be rotated (arrow B) to a convenient position to allow the operator to grip cover 14 while placing his thumb over detent 74. Groove 55 and pin 57 prevent independent rotation of valve cover 14 about slide valve 50. As seen in FIGS. 2 and 3, inlet 20 is in fluid engagement with outlet 22 by means of reduced diameter portion 116 of slide valve 50, and fluid communication between outlet 22 and vent 24 is blocked by lower O-ring 67 and enlarged end portion 117 of slide valve 50 located between lower O-ring 67 and upper surface 81 of piston 80. Slide valve 50 remains in the reset position of FIG. 2 until fluid pressure in line 28 reaches a predetermined high amount at which time fluid pressure acting against face 82 of piston 80 moves piston 80 slightly upward against the bias of spring 100 to permit release of detent 74 under the bias of spring 74. In this position, slide valve 50 is in an operable position and fluid pressure is maintained.

In the event fluid pressure is reduced to atmosphere in line 28; piston 80, under the bias of spring 100, moves to the seated position of FIG. 1 (as detent 74 has been released as described above) and the pressurized gas at outlet 22 is exhausted to atmosphere through bleed port or vent 24. In this manner the pressure in line 28 is reduced to atmosphere thereby shutting down operations. It is noted that O-ring 86 is in engagement with the adjacent surface defining enlarged bore portion 36 with piston 80 in the position of FIG. 2 and 3. But upon movement of piston 80 to the seated position with face 82 adjacent ledge 90, O-ring 86 is out of engagement with the adjacent surface defining enlarged bore portion 38 and spring 100 is highly effective since the sliding friction of O-ring 86 is removed. Thus piston 80 is quick acting upon such an occasion.

It is noted that no separate means are provided to hold piston 80 in a seated position adjacent ledge 90. However, only the small surface area of raised portion 88 of piston face 82 in seated position is exposed to fluid pressure from line 28 and orifice 118 tends to balance the flow of fluid to piston face 82. In the event of vibrations or the like with any fluid leaking past O-ring 106, the fluid may bypass or go around piston 80 in the open area formed by enlarged bore portion 38 and be bled to atmosphere through vent 24. In this arrangement, piston 80 is only temporarily unseated for a relatively small period of time as spring 100 immediately resets piston 80 upon such leakage of fluid from vent 24 around piston 100 thereby to maintain slide valve 50 in the position shown in FIG. 1 without any separate locking means being required for piston 80.

As shown in FIGS. 4 and 7, the face 82 of piston 80 is provided with a plurality of holes 120 circularly arranged thereon. When in operation, the entire face 82 of piston 80 is exposed to fluid pressure from line 28. As shown in FIG. 3, fluid pressure is communicated through holes 120 to the face of a second interior piston 124 housed in piston 80 in chamber 102. Interior piston 124 is provided on the lower end of shaft 130 which is provided in the longitudinal bore 128 of slide valve 50 running the length thereof. The position of inner piston face 126 of inner piston 124 is maintained in engagement with the upper surface 85 of piston face 82 of piston 80 until fluid pressure in line 28 reaches an amount to overcome the biasing of inner spring 134 at which time fluid pressure communicated through holes 120 urges inner piston 124 upwardly against the bias of inner spring 134, thereby driving shaft 130 upward towards indicator means 140. The outer circumference of inner piston 124 has a annular groove 125 for receiving an O-ring 127 provided for engagement with the inner surface of piston 80 to prevent the leaking of fluid around piston 124 in the open area formed by the inner surface of piston 80 and the outer circumference of piston 124. In this way, O-ring 127 affectively seals indicator member 144 from undesired fluid disturbances which would otherwise be transmitted through longitudinal bore 128 of slide valve 50. As shown in FIGS. 1 - 3 and 7, indicator means 140 is mounted in upper recess area 19 of valve cover 14 so that bicolored indicator member 144 is visable. Indicator housing 142 is threadably mounted to the upper end portion 21 of valve cover 14 to secure indicator means 140 sa an integral part of control valve 10. From te sectional view of indicator means 140 in FIG. 1-3, its operation can be understood. In non-operational modes shwon in the FIGS. 1 and 2, bicolored indicator member 144 will have first surface 147 (preferably colored red) visible through transparent cover 148. This provides a visual indication that an unusual pressure condition in the main line has occurred. As shaft 130 is driven upward by fluid pressure on piston face 126, it displaces piston 141 housed in cavity 146. Piston 141 is driven upward against the bias of compression spring 143 against plunger 145 which will rotate bicolored indicator member 144 to second surface 149 (preferably colored green) which will indicate a normal operational mode for control valve 10 which can be observed through transparent cover 148. In practice, first surface 147 can be colored red and second surface 149 can be colored green but the choice of colors of the surfaces would depend upon a specific application and desires the user.

The upper portion 11 of main valve body housing 12 is extremely threaded for receiving locking ring 150. In any specific application of control valve 10 to a overall pressurized system locking ring 150 provides a means for securing control valve 10 to a control panel so that bicolored indicator member 144 is visible to the operator.

In FIG. 9, in sectional view, is shown an alternate embodiment 160 of end plug 46 with application to a system design such as a "first out" or First Fault Annunciator System. As plug 46, plug 160 is threadably received in the lower end of housing 12 with an O-ring provided to effectively seal control valve 10 from leakage. A supply pressure source, usually controlled air pressure, is provided at supply port 164 with a control pressure at pressure port 166. When teh supply pressure provided at supply port 164 is outside a predetermined operating range, shuttle valve 168 operates to close the pressure source to line 163 and open the source to control port 170 thereby indicating a non-operating condition in this control valve by first surface 147 being visible through transparent cover 148. By a pressure source being provided to control port 170 other control valves in the system are maintained in operational mode and the "first fault" in the system is annunciated.

What is claimed as invention is:

1. A pilot operated relay control valve apparatus comprising:
   a. a first elongated housing having a bore extending longitudinally thereof;
   b. a second elongated housing having a bore coaxially aligned with the bore of said first housing;
   c. an annular neck portion of said first housing for slidably engaging the inner wall of a portion of the bore of said second housing;
   d. a slide valve mounted within said coaxial bores for longitudinal movement thereof, said slide valve having:
      i. a first piston on one end of said slide valve, mounted within an enlarged diameter portion of the bore of said first housing, a face of said first piston adapted with a plurality of appertures therethrough;
      ii. a counter-bore extending substantially the length of said slide valve;
      iii. displacement means mounted within said counter-bore for longitudinal movement thereof, said displacement means having a second piston on one end thereof coaxially mounted within said first piston;
   e. means for continuously urging said first piston of said slide valve inwardly to a seated position;
   f. means for continuously urging said second piston to a seated position against said first piston;
   g. port means in fluid communication with said bore of said first housing and exposing the outer face of said first piston to fluid pressure;
   h. a raised annular portion on the outer face of said first piston in alignment with said port means;
   i. a resilient annular seal between said port means and said raised annular portion on the outer face of said piston exposing a relatively small surface area of said first piston is in a seated position, said annular seal permitting the entire outer face of said first piston to be exposed to fluid pressure from said port means when said first piston is out of the seated position;
   j. indicator means mounted on one end of said control valve for movement between a first position to indicate a first operating condition and a second position to indicate a second operating condition, said indicator means moving from said first and second positions thereof whenever a predetermined high fluid pressure is applied to and unseats said second piston the from the first piston.

2. The apparatus of claim 1 further comprising:
   a. a detent means mounted in said second housing and in engagement with said first housing for securing said slide valve in an up position when said slide valve is moved against the bias of said means for urging said first piston inwardly to a seated position;
   b. means for urging said detent out of engagement with said first housing when the outer face of said first piston is exposed to a predetermined high pressure from said port means.

* * * * *